United States Patent [19]

Smoak

[11] 4,237,085

[45] Dec. 2, 1980

[54] METHOD OF PRODUCING A HIGH DENSITY SILICON CARBIDE PRODUCT

[75] Inventor: Richard H. Smoak, Lewiston, N.Y.

[73] Assignee: The Carborundum Company, Niagara Falls, N.Y.

[21] Appl. No.: 21,403

[22] Filed: Mar. 19, 1979

[51] Int. Cl.$^2$ ............................................. C04B 35/56
[52] U.S. Cl. ........................................ 264/65; 106/44
[58] Field of Search .................... 106/44, 73.5; 264/65

[56] References Cited

U.S. PATENT DOCUMENTS

| | | | |
|---|---|---|---|
| 3,852,099 | 12/1974 | Prochazka | 106/44 |
| 3,853,566 | 12/1974 | Prochazka | 106/44 |
| 3,954,483 | 5/1976 | Prochazka | 106/44 |
| 3,960,577 | 6/1976 | Prochazka | 106/44 |
| 3,968,194 | 7/1976 | Prochazka | 106/44 |
| 4,080,415 | 3/1978 | Coppola et al. | 264/65 |

*Primary Examiner*—O. R. Vertiz
*Assistant Examiner*—Mark Bell
*Attorney, Agent, or Firm*—David E. Dougherty; Raymond W. Green; Donald C. Studley

[57] ABSTRACT

A method of pressureless sintering silicon carbide mixtures to obtain a sintered, dense product when the silicon carbide starting materials do not include a densification aid, such as boron, beryllium or aluminum, is described. The starting materials are mixtures containing predominantly particulate silicon carbide and include usually less than about 10 and, preferably, less than about 6 percent by weight of carbon in the form of elemental carbon or in the form of a carbon source material. The mixtures may also contain minor amounts of other additives, such as lubricants, surfactants or agglutinants, to aid in forming a compact, or green body, from the mixtures, or minor amounts of other ceramic materials depending upon the nature of the desired final product. The mixtures are formed into compacts, or green bodies, by known techniques. The powder compact is sintered under substantially pressureless conditions in a sintering atmosphere containing boron to produce a sintered product having a density of at least 85 percent and, preferably, greater than about 90 percent of the theoretical density of silicon carbide.

12 Claims, No Drawings

METHOD OF PRODUCING A HIGH DENSITY SILICON CARBIDE PRODUCT

BACKGROUND OF THE INVENTION

Silicon carbide, a crystalline compound of silicon and carbon, has long been known for its hardness, its strength and its excellent resistance to oxidation and corrosion. Silicon carbide has a low coefficient of expansion, good heat transfer properties, and maintains high strength at elevated temperatures. In recent years, the art of producing high density silicon carbide bodies from silicon carbide powders has been developed. Methods include reaction bonding, chemical vapor deposition, hot pressing and pressureless sintering (initially forming the article and subsequently sintering). Examples of these methods are described in U.S. Pat. Nos. 3,853,566; 3,852,099; 3,954,483; and 3,960,577. The high density silicon carbide bodies so produced are excellent engineering materials and find utility in fabrication of components for turbines, heat exchange units, pumps and other equipment or tools that are exposed to severe wear and/or operation under high temperature conditions. The present invention relates methods of producing silicon carbide articles that have high-density and high-strength characteristics.

In order to obtain high-density and high-strength silicon carbide ceramic materials, various densification additives have been utilized. For example, a method of hot pressing silicon carbide to densities in the order of 98 percent of theoretical by addition of aluminum and iron as densification aids is disclosed by Alliegro, et al., J. Ceram. Soc., Vol. 39, No. 11, Nov., 1956, pages 386 to 389. They found that a dense silicon carbide could be produced from a powder mixture containing 1 percent by weight of aluminum. Their product had a modulus of rupture of 54,000 psi. at room temperature and 70,000 psi. at 1371° C. A more recent advance is the use of boron as a densification aid. Usually, such aids are added in amounts in the range between about 0.3 and about 3.0 percent by weight of the powder mixture to be sintered. The boron additive may be in the form of elemental boron or in the form of boron-containing compounds, for example, boron carbide. Examples of boron-containing silicon carbide powders may be found in U.S. Pat. Nos. 3,852,099; 3,954,483; and 3,968,194.

The presence of excess amounts of boron, greater than that required to insure a dense sintered product, may act to lower the inherent strength of the sintered product, thereby limiting its uses. Also, the presence of excess boron in the sintered product may, in some instances, be detrimental to the oxidation resistance of the product. For these reasons, lessening the amount of boron or boron-containing compounds added to the initial silicon carbide powder mixture is advantageous. However, up to now, the desired density of the sintered silicon carbide product, greater than 90 percent of theoretical, and, preferably, greater than 95 percent of theoretical, has not been obtainable in pressureless sintering processes except by the addition of densification aids to the initial starting material.

SUMMARY OF THE INVENTION

It has now been found that high densification can be obtained in pressureless sintering processes when the silicon carbide starting materials do not include a densification aid, such as boron, beryllium or aluminum. The starting materials are mixtures containing predominantly particulate silicon carbide and include usually less than about 10 and, preferably, less than about 6.0 percent by weight of carbon in the form of elemental carbon or in the form of a carbon source material. The mixtures may also contain minor amounts of other additives, such as lubricants, surfactants or agglutinants, to aid in forming a compact, or green body, from the mixtures, or minor amounts of other ceramic materials depending upon the nature of the desired final product. The mixtures are formed into compacts, or green bodies, by known techniques. The powder compact is sintered under substantially pressureless conditions in a sintering atmosphere containing boron to produce a sintered product having a density of at least 85 percent and, preferably, greater than about 90 percent of the theoretical density of silicon carbide.

The crystal structure of the silicon carbide starting material may be alpha, beta, amorphous or mixtures thereof. The starting mixtures typically contain from about 90 to about 99 parts by weight of particulate silicon carbide having a surface area from about 1 to about 100 m$^2$/g. from about 1 to about 10 parts by weight of carbon or a carbon source material. Suitable carbon source materials are carbonizable organic materials which, under sintering conditions, provide elemental carbon, usually in amounts in the neighborhood of 30 to 50 percent or more of their starting weight.

The components are mixed, suitably by use of a solvent to disperse the carbon or carbon source material throughout the silicon carbide powder and to coat the particles therewith. The mixture is then dried to evaporate the solvent and formed into a compact. The compact is usually formed in the shape of the desired final product and usually has a density of at least about 1.60 g/cc. The compact is sintered at a temperature between about 1900° and about 2500° C. and, more preferably, between about 1950° and 2250° C. The sintering step is carried out in an atmosphere, substantially inert to the reactants, and which contains boron in sufficient amounts to produce a final densified product. The amount of boron in the atmosphere during sintering may be varied widely dependant upon the sintering time, temperature and the gas flow during the sintering process. The sintered product typically contains less than 0.5 percent by weight and, preferably, less than 0.3 percent by weight of boron.

Boron may be fed into the sintering atmosphere in the form of a gas, such as boron trichloride, suitably in mixtures with the inert gases usually used in pressureless sintering operations, namely, nitrogen, argon or helium. Boron may also be added to the sintering atmosphere by inclusion into the sintering chamber of a boron source material, for example, boron, per se, or compounds of boron, such as boron carbide, which produce boron in the atmosphere at sintering temperatures. Such materials may suitably be introduced into the sintering chamber by initially preparing a solution or slurry of a boron compound and applying the solution or slurry to at least a portion of the interior of the chamber or to the crucibles or containers used in the sintering operation. Suitably, acetone is used as the carrier, but other carriers, such as water, or other available solvents may be employed, their only purpose is to enable good distribution of the boron material on the walls of the sintering chamber or the crucibles. Alternatively, boron may be added to the sintering atmosphere by the use of furnace components, parts and the like, which contain a significant amount of boron, or by enclosing the compact within a closed container with a boron source material. The compact may be enclosed, or packed, in a boron source material.

DETAILED DESCRIPTION OF THE INVENTION

The present invention provides a method of sintering mixtures of silicon carbide and carbon or a carbon source material without the inclusion of a sintering aid in the mixture.

The silicon carbide component is utilized in a finely-divided form and, preferably, has a particle size of less than about 5 microns and, more preferably, less than about 2 microns. The useful silicon carbide starting materials usually have surface areas greater than about 4.0 m$^2$/g, and materials having surface areas greater than about 10.0 m$^2$/g are eminently useful.

The carbon component, present in amounts of less than about 10 percent by weight and, preferably, from about 0.5 to about 6.0 percent by weight, of the mixture may be utilized in the form of finely-divided carbon having a particle size less than about 5 microns and, preferably, less than about 2.0 microns. However, it is preferred to utilize a carbon source material such as a carbonizable organic material which serves the dual purpose of acting as a binder during the cold pressing operation and subsequently as a source of carbon when it carbonizes during the sintering operation. Particularly useful in this mode are resins which provide residual carbon in amounts between about 30 to about 50 percent or more by weight after carbonizing.

The silicon carbide starting material and the carbon or carbon source material are thoroughly mixed to obtain a dispersion of the carbon or carbon source material throughout the silicon carbide material.

The silicon carbide-carbon mixture can be cold pressed to form a compact, or green body. The cold pressing step is suitably carried out in a metal die at pressures between about 5,000 and about 20,000 psi. Generally, pressures above about 10,000 psi are useful. Pressures above about 18,000 psi may be utilized; however, usually only minimal beneficial results in the final sintered product are obtained. The pressed product, compact, typically has a density ranging between about 1.7 and about 1.9 gm/cc. The porosity of the compacts typically range from about 35 to about 50 percent.

The sintering step is carried out under substantially pressureless conditions, suitably in a graphite resistance element furnace. Temperatures between about 1900° and about 2250° C. are eminently useful. Usually, when temperatures less than about 1900° C. are employed, the sintering process does not produce the desired dense product. Sintering temperatures over about 2250° C. may cause deterioration of the sintered product.

The sintering step is carried out in a boron-containing atmosphere that is otherwise inert to the mixtures being sintered. Inert gases, such as argon, helium and nitrogen, are typically employed. In some instances, a vacuum in the order of about 10$^{-3}$ torr is useful.

Generally, the mixtures of the present invention sinter under the foregoing conditions to produce the desired sintered product when sintering times between about ¼ to about 6 hours are employed. Sintering times between about ½ to about 2 hours are usually sufficient.

The present invention will be more fully illustrated by the following examples 5 through 12, which are not to be interpreted as limiting. Unless otherwise indicated, all parts and percentages are by weight, and all temperatures are in degrees Celsius.

EXAMPLE 1

A mixture containing 196 parts of silicon carbide having an average particle size of less than 5 microns, 5.36 parts of boron carbide also having an average particle size of less than 5 microns, and 9.76 parts of carbon in the form of a phenolic resin, (about 2% by weight carbon), designated as B178 Resin by Varcum Chemical Division, Reichhold Chemicals, Inc., was made by blending the components in acetone. The mixture was then dried, crushed and screened through a 60 mesh screen.

The screened powder was then cold pressed at 12,000 psi using a metal die to produce a plurality of discs 1⅛" in diameter and weighing approximately 10 gm. each.

The discs were then placed in a previously prepared boron-treated graphite crucible and covered with a particular mixture of silicon carbide, phenolic resin and boron carbide.

The graphite crucible was previously prepared by initially applying a slurry containing 5 grams of boron carbide in 50 milliliters of acetone to the interior of the crucible. The painted crucible was then filled with a silicon carbide mixture containing 0.5 percent by weight of boron in the form of boron carbide and fired at 2150° C. for 15 minutes.

The cover, or envelope, mixture contained 99.5 gm silicon carbide, 0.64 gm. boron carbide (about 0.5 percent by weight) and 10 gm of a paraffinic wax.

The covered discs in a prepared crucible were then sintered in a graphite resistance element furnace at a temperature of 2120° C. for 45 minutes under an argon atmosphere. The sintering temperature was reached by an initial heating to 1500° C. over a period of 4.5 hours and then increasing temperature at a rate of 300° per hour to 2120° C. with a hold at that temperature for the 45 minute sintering time. After firing, the density of the discs was found to be 3.114 g/cc, corresponding to about 97% of the theoretical density of silicon carbide.

The foregoing example is shown in the following table as Example 1. Examples 2 through 4 were carried out in a similar manner, except that the amounts of boron, as boron carbide, included in the cover mixtures were varied.

TABLE I

| Example | Percent Boron in Cover Mixture | g/cc Fired Density | Percent of Theoretical Density of Silicon Carbide |
|---|---|---|---|
| 1 | 0.5 | 3.114 | 97.0 |
| 2 | 1.0 | 3.115 | 97.0 |
| 3 | 5.0 | 3.118 | 97.1 |
| 4 | 0.5 | 3.108 | 96.8 |

EXAMPLE 5

THE INVENTION

The procedure of Example 1 was followed, with the single exception that no boron or boron source material was added to the initial silicon carbide mixture. In the manner of Example 1, the mixture was placed in a previously prepared boron-treated crucible, covered with a mixture containing 0.5 percent by weight boron and sintered at 2120° C. for a period of 45 minutes. This example is shown in Table II as Example 5. Examples 6 through 12 were carried out in a similar manner.

TABLE II

| Example | Percent Boron in Cover Mixture | g/cc Fired Density | Percent of Theoretical Density of Silicon Carbide |
| --- | --- | --- | --- |
| 5 | 0.5 | 3.065 | 95.5 |
| 6 | 0.5 | 3.073 | 95.7 |
| 7 | 1.0 | 3.078 | 95.9 |
| 8 | 1.0 | 3.070 | 95.6 |
| 9 | 5.0 | 3.113 | 97.0 |
| 10 | 5.0 | 3.082 | 96.0 |
| 11 | 0.5 | 3.107 | 96.8 |
| 12 | 0.5 | 3.109 | 96.9 |

It will be appreciated that the present invention is not to be considered as limited to the specific examples and embodiments given in the foregoing and that various modifications may be made within the ordinary skill of the art without departing from the spirit and scope of the invention.

What is claimed is:

1. A method of sintering under substantially pressureless conditions a mixture consisting of particulate silicon carbide containing less than about 6.0 percent by weight carbon in the form of elemental carbon or a carbon source material comprising the steps of:
   a. forming a compact of said mixture, and
   b. sintering said compact in an atmosphere containing boron to produce a sintered product having a density greater than about 85 percent of theoretical.

2. The method of claim 1 wherein the sintered product has a density greater than 90 percent of theoretical.

3. The method of claim 1 wherein the sintered product contains less than about 0.5 percent by weight boron.

4. The method of claim 1 wherein boron in the sintering atmosphere is provided by a boron source material within the sintering chamber.

5. The method of claim 4 wherein the boron source material is applied to at least a portion of the interior of the sintering chamber in the form of a slurry prior to sintering.

6. The method of claim 4 wherein the boron source material is boron carbide.

7. The method of claim 4 wherein the boron source material is provided by a cover mixture of silicon carbide containing a boron source material in which the compact is packed.

8. The method of claim 1 wherein boron in the sintering atmosphere includes an inert gas.

9. The method of claim 8 wherein the inert gas is nitrogen.

10. The method of claim 8 wherein the inert gas is argon.

11. The method of claim 8 wherein the inert gas is helium.

12. The method of claim 8 wherein the boron source material is boron trichloride.

* * * * *